O. LIEBKNECHT.
PROCESS OF MAKING SODIUM CYANID.
APPLICATION FILED FEB. 28, 1910.
969,885.
Patented Sept. 13, 1910.
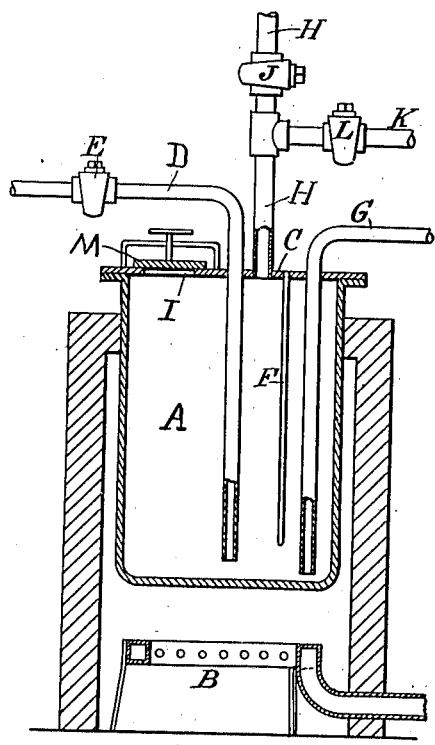

UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL CO., OF NEW YORK, N. Y., A CORPORATION OF NEW YORK.

PROCESS OF MAKING SODIUM CYANID.

969,885.  Specification of Letters Patent.  Patented Sept. 13, 1910.

Application filed February 28, 1910. Serial No. 546,489.

*To all whom it may concern:*

Be it known that I, OTTO LIEBKNECHT, a subject of the Emperor of Germany, residing at Frankfort-on-the-Main, Germany, have invented a new and useful Process of Making Sodium Cyanid, of which the following is a specification.

This invention relates to a new and useful process of making sodium cyanid from metallic sodium by reaction with trimethylamin.

I have discovered that if dry vapors of trimethylamin are passed into highly heated molten metallic sodium, the formation of sodium cyanid takes place in connection with the formation of various carbon hydrogen compounds, carbon and hydrogen, as may be illustrated by the following equation in which $C_xH_y$ represents the carbon hydrogen compounds:

The sodium cyanid may subsequently be freed from the carbon by any of the usual mechanical means, as for instance, by filtering the mixture, the carbon hydrogen compounds and the hydrogen passing off at the high temperature used, as gases. The formation of carbon in its free state may also be avoided chemically, for example, by the addition of di-sodium cyanamid which combines with the carbon to form sodium cyanid, according to the equation:

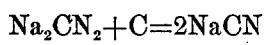

di-sodium cyanamid being added until a sample does not show any more carbon: or ammonia may be added to the trimethylamin whereby a separation of carbon is prevented, in accordance with the following equations:

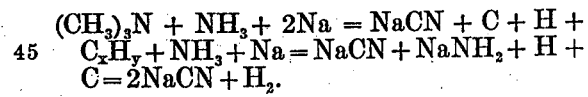

The formula $C_xH_y$ as before stated, represents the carbon hydrogen compounds which at the high temperature used exist in gaseous form and pass off as a gas together with the hydrogen.

The drawing illustrates diagrammatically one form of apparatus with which my process may be practiced.

In the drawing A represents a pot preferably of iron set in a suitable furnace.

B is a burner for heating the furnace and pot and may be of any suitable construction, preferably in the form of a gas burner.

The pot A is provided with a cover C in which are suitable apertures through which intake pipe D, exhaust pipe H, thermometer pipe F and pressure pipe G communicate with the interior of pot A.

I is a hand-hole closed by a suitable cover M.

Intake pipe D is provided with a cock E and exhaust pipe H is provided with a cock J. Connecting with the exhaust pipe H is a pressure pipe K controlled by a cock L and leading to any suitable source of pressure.

As an example of practicing my process in connection with apparatus of the above type, I give the following: 7 kilograms of sodium may be heated in pot A by the means disclosed to about 700° centigrade, the temperature being determined by a thermometer inserted in thermometer pipe F, and about 18 kilograms of trimethylamin passed in through intake pipe D. Cock L should be closed and cock J opened so that the waste gases may pass off through exhaust pipe H. When the reaction is finished and sodium cyanid formed the cocks E and J are closed, cock L opened and pressure applied through pipe K which forces the finished charge up through pipe G to a suitable filter. The sodium cyanid formed as stated contains free carbon which may be removed by filtration or otherwise as stated above, so that the resulting sodium cyanid will be white.

It is obvious that the apparatus and the proportions of the materials used in the reaction may be changed without varying the spirit of my invention.

What I claim and desire to secure by Letters Patent of the United States is:

1. A process of making sodium cyanid from metallic sodium consisting in passing vapors of trimethylamin into highly heated molten sodium.

2. A process of making sodium cyanid from metallic sodium consisting in passing vapors of trimethylamin into highly heated molten sodium and freeing the resulting sodium cyanid from carbon.

3. A process of making sodium cyanid from metallic sodium consisting in passing vapors of trimethylamin into highly heated molten sodium in the presence of ammonia.

In testimony whereof I have signed this specification in the presence of two subscribing witnesses.

OTTO LIEBKNECHT.

Witnesses:
 FRANZ HASSLACHER,
 ERWIN DIPPEL.